(12) United States Patent
Higashi et al.

(10) Patent No.: US 7,549,206 B2
(45) Date of Patent: Jun. 23, 2009

(54) SHELL FLOW SENSOR

(75) Inventors: Robert E. Higashi, Shorewood, MN (US); Son T. Lu, Plymouth, MN (US); Jeffrey A. Ridley, Shorewood, MN (US)

(73) Assignee: Honeywell International Inc., Morristown, NJ (US)

( * ) Notice: Subject to any disclaimer, the term of this patent is extended or adjusted under 35 U.S.C. 154(b) by 59 days.

(21) Appl. No.: 11/891,787

(22) Filed: Aug. 13, 2007

(65) Prior Publication Data

US 2009/0044620 A1    Feb. 19, 2009

(51) Int. Cl.
*H01S 4/00*    (2006.01)

(52) U.S. Cl. .................................................. 29/592.1

(58) Field of Classification Search .............. 73/204.26, 73/204.25; 29/592.1, 593, 592
See application file for complete search history.

(56) References Cited

U.S. PATENT DOCUMENTS

| | | | |
|---|---|---|---|
| 5,869,749 A | 2/1999 | Bonne et al. | 73/53.01 |
| 5,886,249 A | 3/1999 | Bonne et al. | 73/24.02 |
| 5,955,771 A * | 9/1999 | Kurtz et al. | 257/419 |
| 6,314,811 B1 * | 11/2001 | Goldner et al. | 73/570 |
| 6,347,543 B1 * | 2/2002 | Geier et al. | 73/23.31 |
| 6,871,537 B1 | 3/2005 | Gehman et al. | 73/204.26 |
| 7,000,452 B2 | 2/2006 | Bonne et al. | 73/23.25 |
| 2006/0261252 A1 | 11/2006 | Cole et al. | 250/214.1 |
| 2007/0028670 A1 | 2/2007 | Bonne et al. | 73/31.05 |
| 2007/0044554 A1 | 3/2007 | Higashi et al. | 73/204.25 |
| 2007/0113642 A1 | 5/2007 | Bonne et al. | 73/204.11 |

* cited by examiner

*Primary Examiner*—Jewel Thompson
(74) *Attorney, Agent, or Firm*—Kermit D. Lopez; Luis M. Ortiz

(57) ABSTRACT

A flow sensor system and a method for fabricating the same. A substrate is provided, comprising a detector wafer upon which a flow sensor is formed. One or more shells can then be configured upon the substrate whose walls form a flow channel. The flow channel is fabricated directly upon the substrate in a manner that allows the flow channel to couple heat transfer directly to the flow sensor in order to eliminate the need for two or more different types of sacrificial layers during the fabrication of the flow sensor upon the substrate and in which the shell(s) is coupled with fluidic measurement to provide for the flow sensor.

13 Claims, 11 Drawing Sheets

SHELL FLOW SENSOR

TECHNICAL FIELD

Embodiments are generally related to the detection of fluids. Embodiments are additionally related to liquid flow sensors. Embodiments are also related to techniques for fabricating liquid flow sensors.

BACKGROUND OF THE INVENTION

Sensors have been used to measure flow rates in various medical, process, and industrial applications, ranging from portable ventilators supplying anesthetizing agents to large-scale processing plants in a chemical plant. In these applications, flow control is an inherent aspect of proper operation, which is achieved in part by using flow sensors to measure the flow rate of a fluid within the flow system. In many flow systems, e.g., fuel cell flow systems containing a binary mixture of methanol and water, the chemical composition of the fluid may change frequently.

A flow system is often required to flow more than one fluid having different chemical and thermo physical properties. For example, in a semiconductor processing system that passes a nitrogen-based gas, the nitrogen-based gas may at times be replaced by a hydrogen-based or helium-based gas, depending on the needs of the process; or in a natural gas metering system, the composition of the natural gas may change due to non-uniform concentration profiles of the gas.

Fluid flow sensors are thus important in a variety of applications. It is often necessary to determine the composition of a fluid utilizing a liquid or fluid flow sensor. One method for determining the composition of the fluid is to measure its thermal conductivity and compare the resulting value to a standard value. Measurements can be obtained by measuring power transferred from a heater to the fluid.

Current approaches for fabricating liquid flow sensors for very low flow applications are constrained by methods of coupling flow to the flow sensor while maintaining a minimal system volume. Coupling between the sensing element and an isolated flow channel has proved difficult to produce. Earlier processes involved the use of a nickel sacrificial layer, which often oxidized, resulting in an undependable final release. It is believed that such problems can be overcome through the introduction of a flow sensor structure and fabrication technique in which the flow channel is built directly on the detector wafer and thereby couples the heat transfer directly to the liquid flow sensor. Such improvements are discussed in, greater detail herein.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide for an improved flow sensor.

It is another aspect of the present invention to provide for an improved method for fabricating a flow sensor.

It is yet a further aspect of the present invention to provide for a flow sensor that can be fabricated with a flow channel formed directly on a detector wafer to thereby couple heat transfer directly to the sensor.

It is still a further aspect to provide for an improved flow sensor fabrication process that eliminates the need for two different types of sacrificial layers.

The aforementioned aspects of the invention and other objectives and advantages can now be achieved as described herein. A flow sensor system and a method for fabricating the same are disclosed. In general, a substrate is provided, comprising a detector wafer upon which a flow sensor is formed. One or more shells can then be configured upon the substrate whose walls form a flow channel. The flow channel is fabricated directly upon the substrate in a manner that allows the flow channel to couple heat transfer directly to the flow sensor in order to eliminate the need for two or more different types of sacrificial layers during the fabrication of the flow sensor upon the substrate and in which the shell(s) is coupled with fluidic measurement to provide for the flow sensor.

The "shell" flow sensor described herein can be fabricated utilizing a standard microbridge process with the exception that an additional low stress dielectric can be provided to increase the pressure range of the completed device. A thin (e.g., ~1-2 kA) layer of polyimide can be capped with $SiO_2$ and patterned to form what will be slots at the edge of the flow channel. Next, a thick layer of polyimide can be deposited and patterned with a slope to form what will become the flow channel. A thick layer of $SiO_2$ can be conformably deposited over the polyimide (e.g., TEOS) and then patterned to expose the thin polyimide slots at the edge of the flow channel.

The polyimide can be then removed utilizing an oxygen plasma etch, thereby releasing the shells forming the flow channels. The small polyimide slots are then filled in with a final TEOS growth that will seal the flow channels. The oxide is removed from the bond pads. Three holes can also be patterned on the back of each die and DRIE etched through the wafer from the back. Two of the holes can be utilized to attach capillaries, which can be formed from materials such as glass coated with polyimide, steel, etc. to couple the fluid flow into and out of the chip (i.e., flow sensor system) and the third hole will act to remove the silicon from below the flow sensor providing thermal isolation for the sensor device/system.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate at least one embodiment of the present invention and are not intended to limit the scope of the invention.

Figure 1:
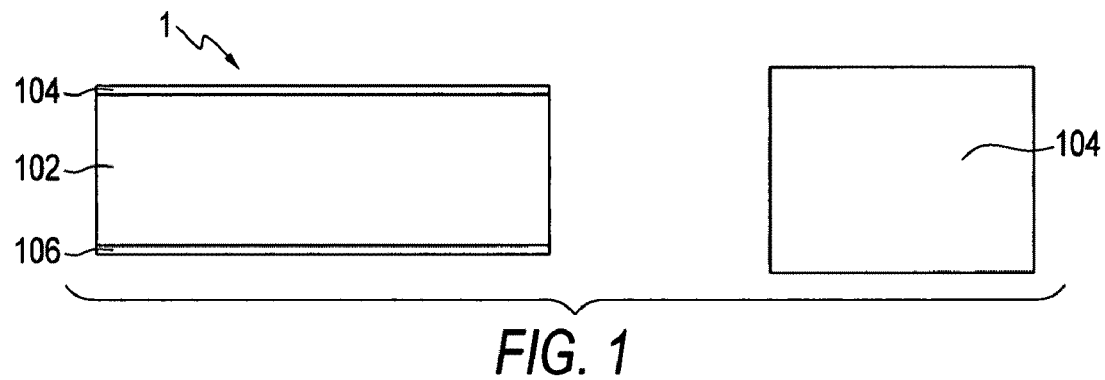
FIG. 1 illustrates the first step of a process for fabricating a shell flow sensor, in accordance with a preferred embodiment.

FIG. 1 illustrates the first step 1 of a process for fabricating a shell flow sensor, in accordance with a preferred embodiment. Note that in FIGS. 1-16, identical or similar parts or elements are generally indicated by identical reference numerals. FIGS. 1-16 thus illustrate together an overall fabrication technique for creating shell flow channels in the context of a phased-type gas analyzer IC chip that does not require a second wafer for the configuration of a flow channel. In each of FIGS. 1-16, side and plan views of the same device or structure are provided to provide for an enhanced view of the particular fabrication step. As indicated in the side view of FIG. 1, a double polished silicon wafer substrate 102 can be provided with polished layers 104 and 106 that are located adjacent substrate 102. The layer 104 is shown in the plan view of FIG. 1.

Figure 2:
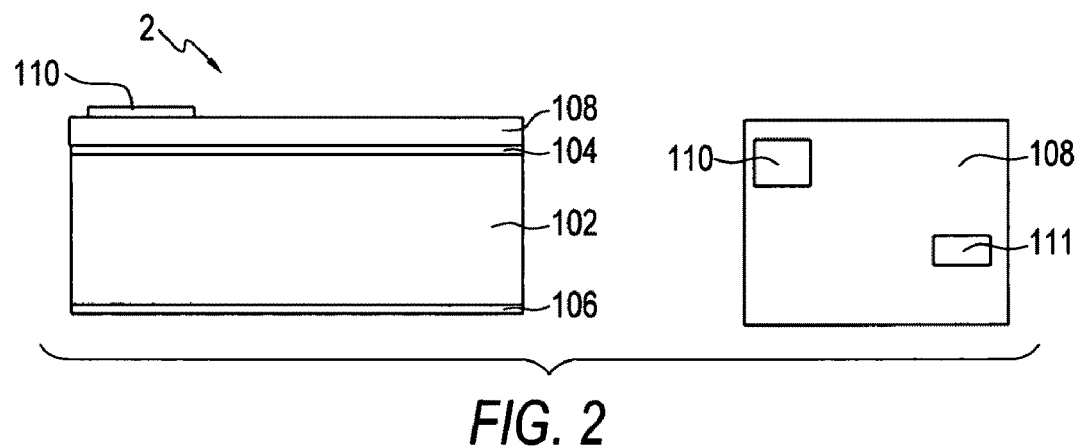
FIG. 2 illustrates the second step of a process for fabricating a shell flow sensor, in accordance with a preferred embodiment.

FIG. 2 illustrates the second step 2 of a process for fabricating a shell flow sensor, in accordance with a preferred embodiment. As depicted in FIG. 2, a bottom bridge nitride (e.g., approximately 5000A) layer 108 can be low stress sputtered with respect to layer 104. Heater components 110 and 111 (e.g., CrOx/Pt/CrOx) can be deposited and patterned above substrate 102 as indicated by the side and plan views illustrated in FIG. 2.

Figure 3:
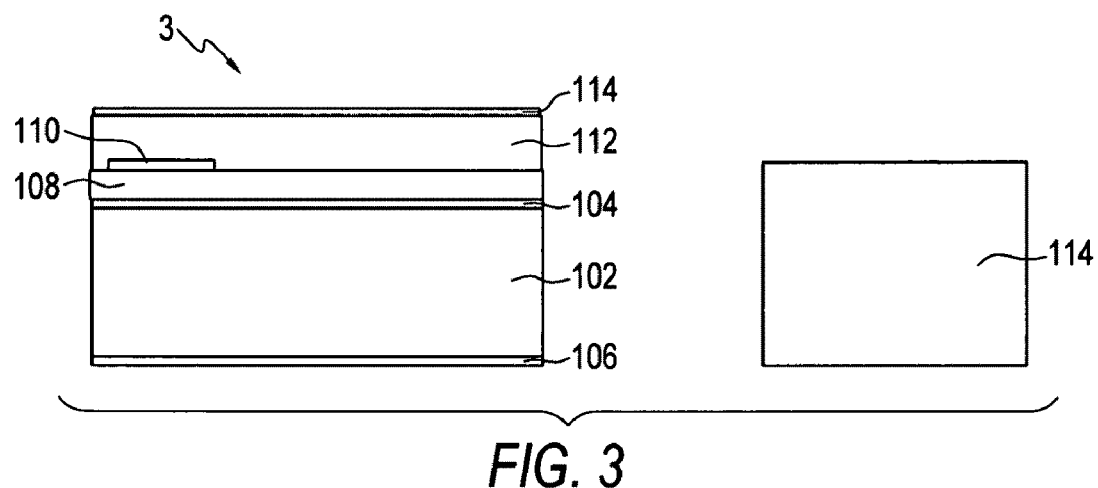
FIG. 3 illustrates the third step of a process for fabricating a shell flow sensor, in accordance with a preferred embodiment.

FIG. 3 illustrates the third step 3 of a process for fabricating a shell flow sensor, in accordance with a preferred embodiment. As indicated by side and plan view shown in FIG. 3, a layer 112 can be deposited above layer 108, and another layer 114 formed above layer 112. Layer 112 constitutes a nitride layer and layer 114 comprises a nickel layer. Step 3 depicted in FIG. 3 thus includes cap Pt features with a top nitride (e.g., approximately 8000 A) layer 112, which is then covered with the thin nickel etch stop layer 114 for later etches to protect surface materials.

Figure 4:
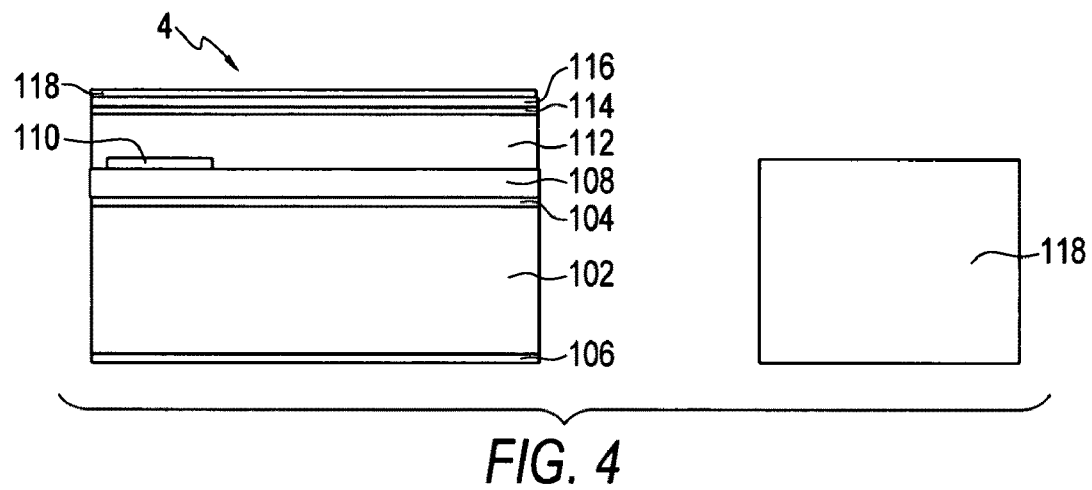
FIG. 4 illustrates the fourth step of a process for fabricating a shell flow sensor, in accordance with a preferred embodiment.

FIG. 4 illustrates the fourth step 4 of a process for fabricating a shell flow sensor, in accordance with a preferred embodiment. Follow processing of the operation depicted in FIG. 3, an operation can be performed in which a thin polyimide (e.g., approximately 4000 A) layer 116 is deposited and capped by a thin $SiO_2$ layer 118 (e.g., approximately 1000 A PECVD).

Figure 5:
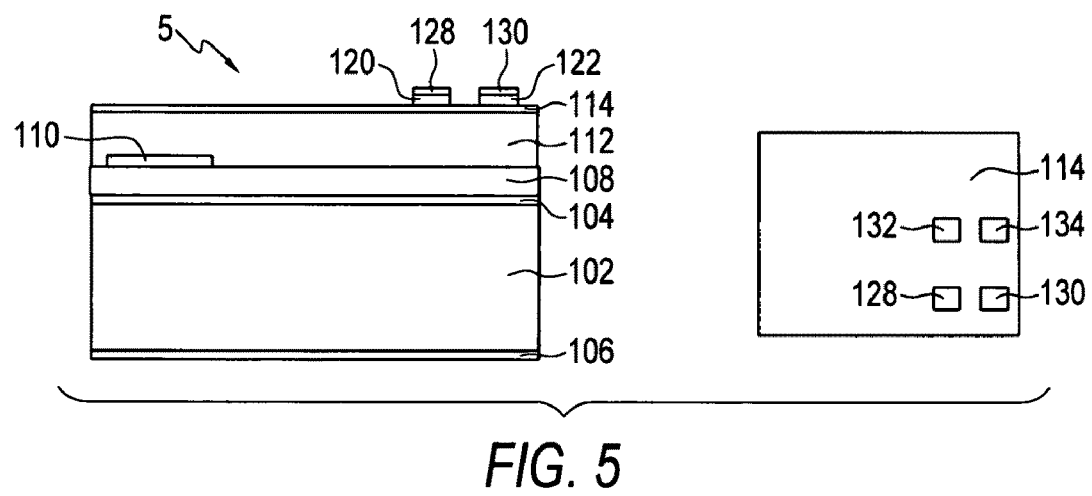
FIG. 5 illustrates the fifth step of a process for fabricating a shell flow sensor, in accordance with a preferred embodiment.

FIG. 5 illustrates the fifth step 5 of a process for fabricating a shell flow sensor, in accordance with a preferred embodiment. FIG. 5 indicates that the $SiO_2$ layer 118 and the thin polyimide layer 116 can be patterned for what will later be etch vents to remove the thicker polyimide. Patterning of layer 118 results in $SiO_2$ structures 128, 130, 132, and 134, which are depicted in the plan view shown in FIG. 5. Patterning of the polyimide layer 116 results in polyimide structures 120 and 122, which are illustrated in the side view shown in FIG. 5.

Figure 6:
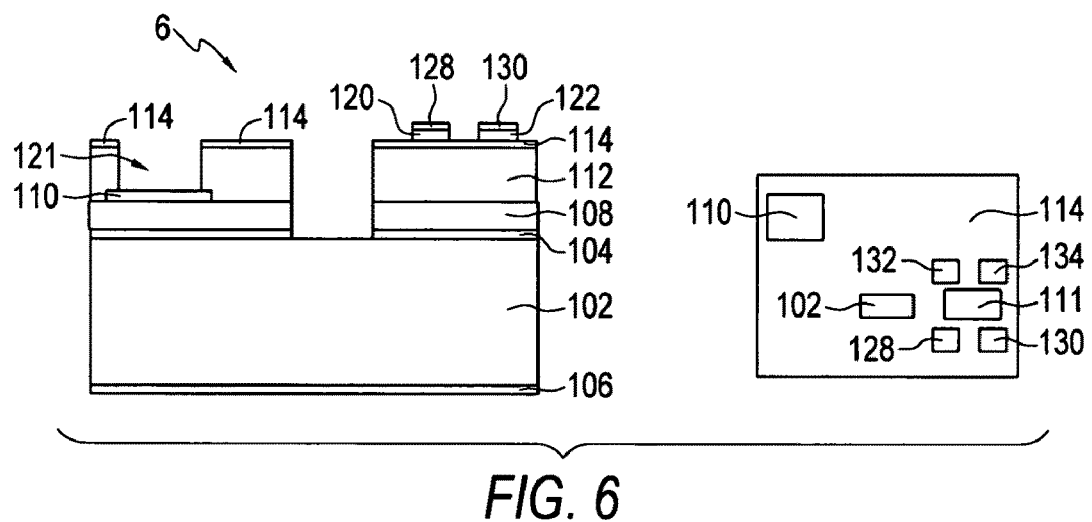
FIG. 6 illustrates the sixth step of a process for fabricating a shell flow sensor, in accordance with a preferred embodiment.

FIG. 6 illustrates the sixth step 6 of a process for fabricating a shell flow sensor, in accordance with a preferred embodiment. In the operation depicted in FIG. 6, a dielectric layer can be cut to expose electrical contacts and silicon where a gas inlet and outlet holes will be located. This access feature can also allow for plasma etching of polyimide in the vicinity of the resulting inlet/outlet port. A gap 121, for example, is shown in the side view in FIG. 6. Such a gap 121 is located above the heater component 110, which in turn sits above layer 108.

Figure 7:
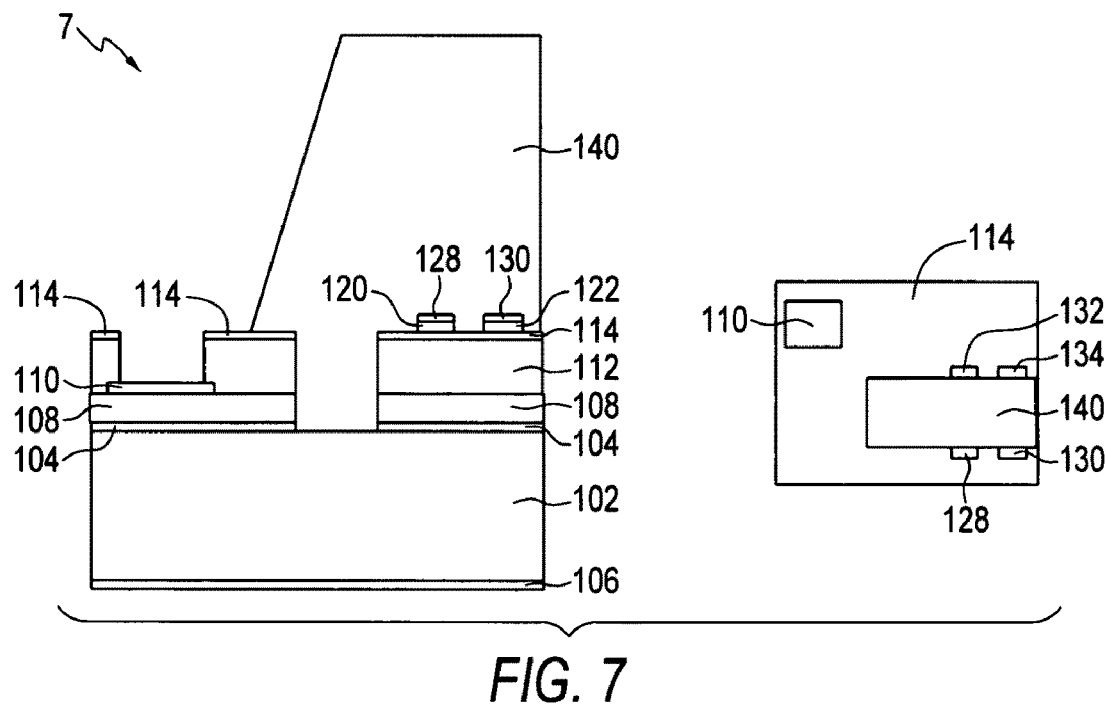
FIG. 7 illustrates the seventh step of a process for fabricating a shell flow sensor, in accordance with a preferred embodiment.

FIG. 7 illustrates the seventh step 7 of a process for fabricating a shell flow sensor, in accordance with a preferred embodiment. The operation illustrated in the side and plane views of FIG. 7, involve the deposition of a thick polyimide layer 140. Depending upon the operation involved, it is possible that two to four sequential coats with hard brakes therebetween may be necessary. A very thick resist can then be applied over the polyimide and patterned where gas channels are to be located, thereby allowing for shrinkage of any photoresist features which automatically create sloped Pi sides. Slopes should preferably land on vent tabs.

Figure 8:
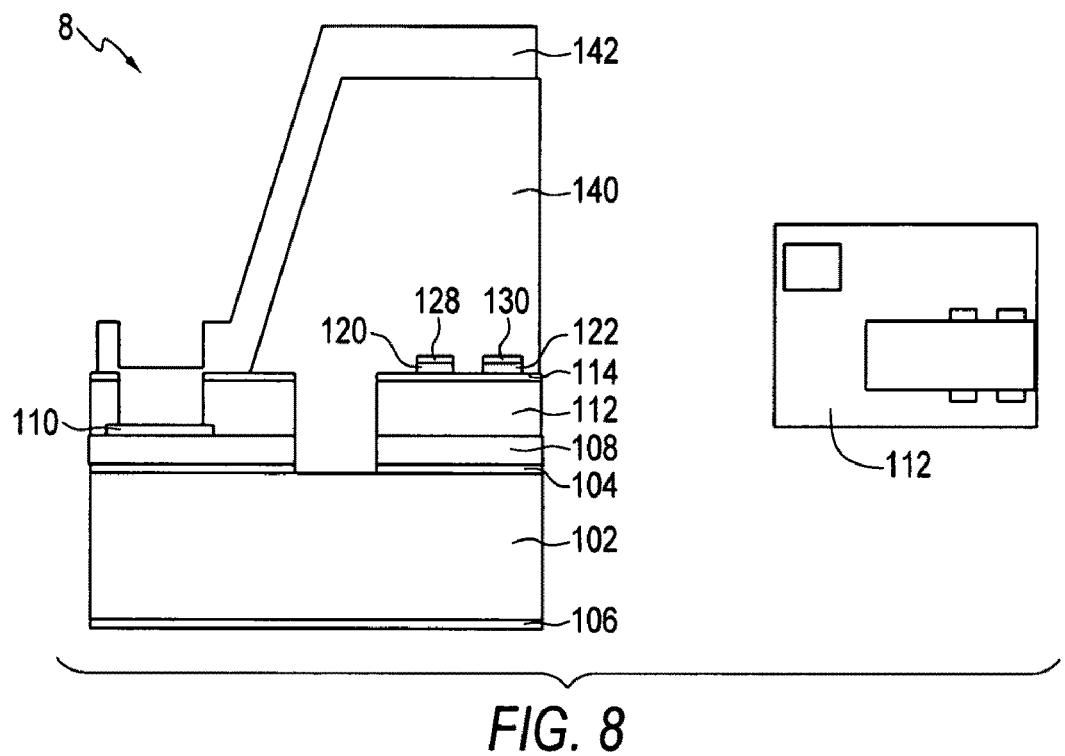
FIG. 8 illustrates the eighth step of a process for fabricating a shell flow sensor, in accordance with a preferred embodiment.

FIG. 8 illustrates the eighth step 8 of a process for fabricating a shell flow sensor, in accordance with a preferred embodiment. In this step, the main shell can be created by depositing a layer 142 of approximately 1-2 µm of TEOS $SiO_2$ using a 300 C formulation. Note that the term "TEOS" as utilized herein refers generally to tetraethyl orthosilicate, which is a major chemical compound with the formula $Si(OC_2H_5)_4$. Often abbreviated TEOS, this molecule generally is composed of four ethyl groups attached to the $SiO_4^{4-}$ ion, which is called orthosilicate. As an ion in solution, orthosilicate does not exist. Alternatively TEOS can be considered to be the ethyl ester of orthosilicic acid, $Si(OH)_4$.

Figure 9:
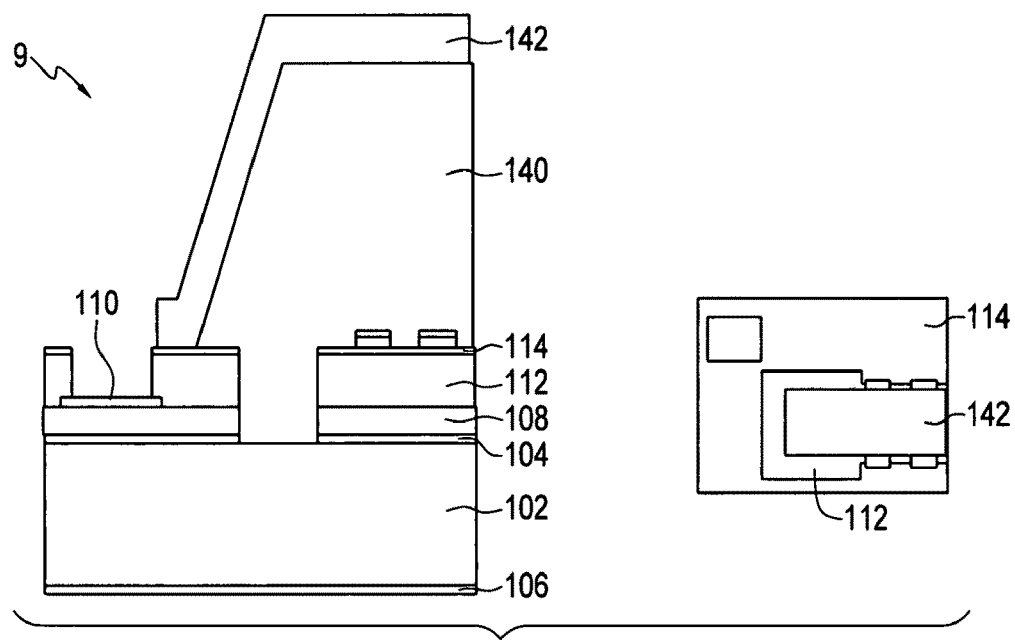
FIG. 9 illustrates the ninth step of a process for fabricating a shell flow sensor, in accordance with a preferred embodiment.

FIG. 9 illustrates the ninth step 9 of a process for fabricating a shell flow sensor, in accordance with a preferred embodiment. In step 9, the shell oxide can be patterned and LAM-etched in order to expose the ends of vent holes, and also expose bond pads, while leaving the oxide for the shell.

Figure 10:
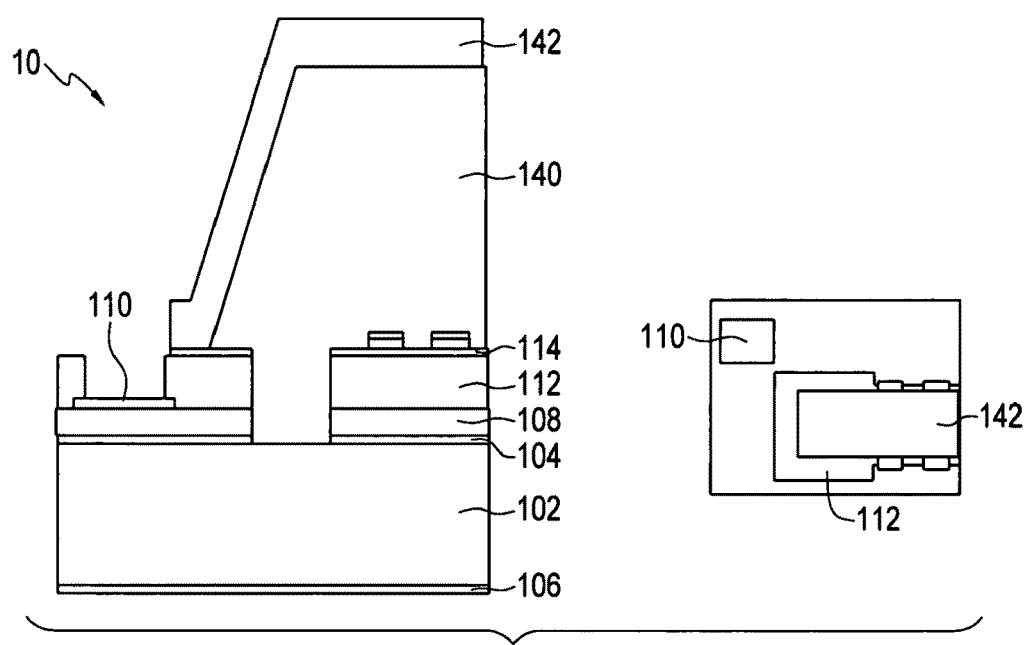
FIG. 10 illustrates the tenth step of a process for fabricating a shell flow sensor, in accordance with a preferred embodiment.
Figure 11:
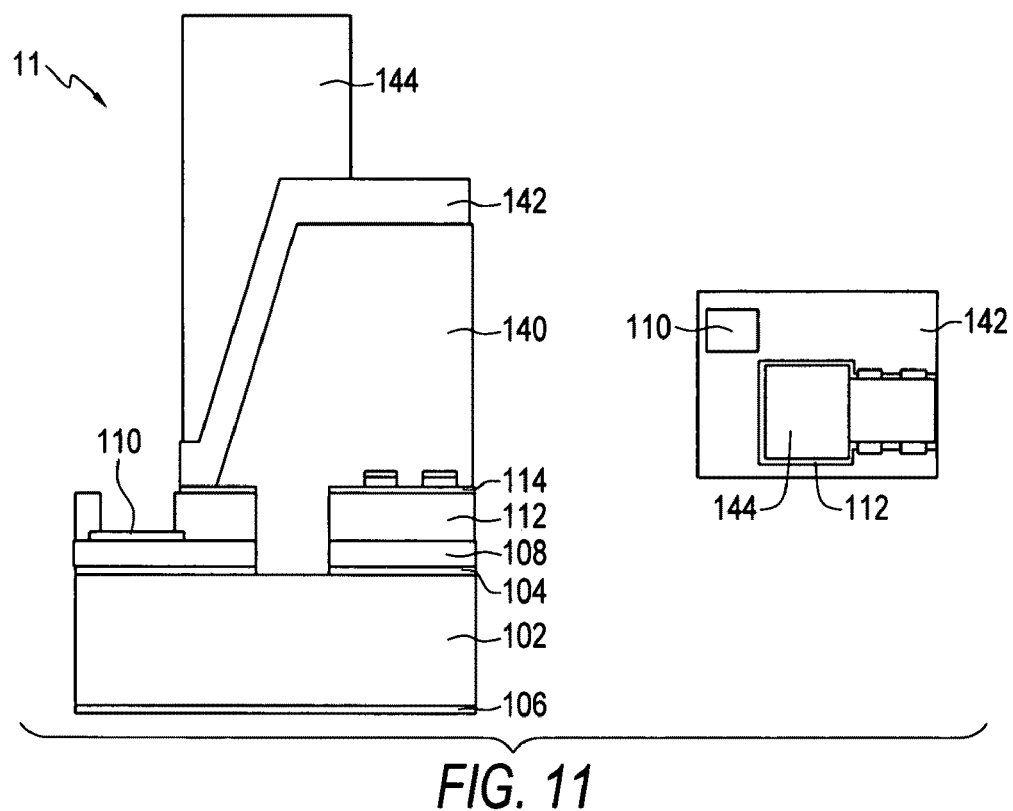
FIG. 11 illustrates the eleventh step of a process for fabricating a shell flow sensor, in accordance with a preferred embodiment.

FIG. 10 illustrates the tenth step 10 of a process for fabricating a shell flow sensor, in accordance with a preferred embodiment. Using the same mask as used in step 9, an ion mill field etch stop metal operation can be performed. FIG. 11 illustrates the eleventh step 11 of a process for fabricating a shell flow sensor, in accordance with a preferred embodiment. In the operation depicted in FIG. 11, a layer 144 can be deposited and etched as reinforcing SU-8 blocks to strengthen capillary insertion points as well as ridges that can support the wafer or substrate 102 when the entire device is located upside down so that it does not hit the shell.

Figure 12:
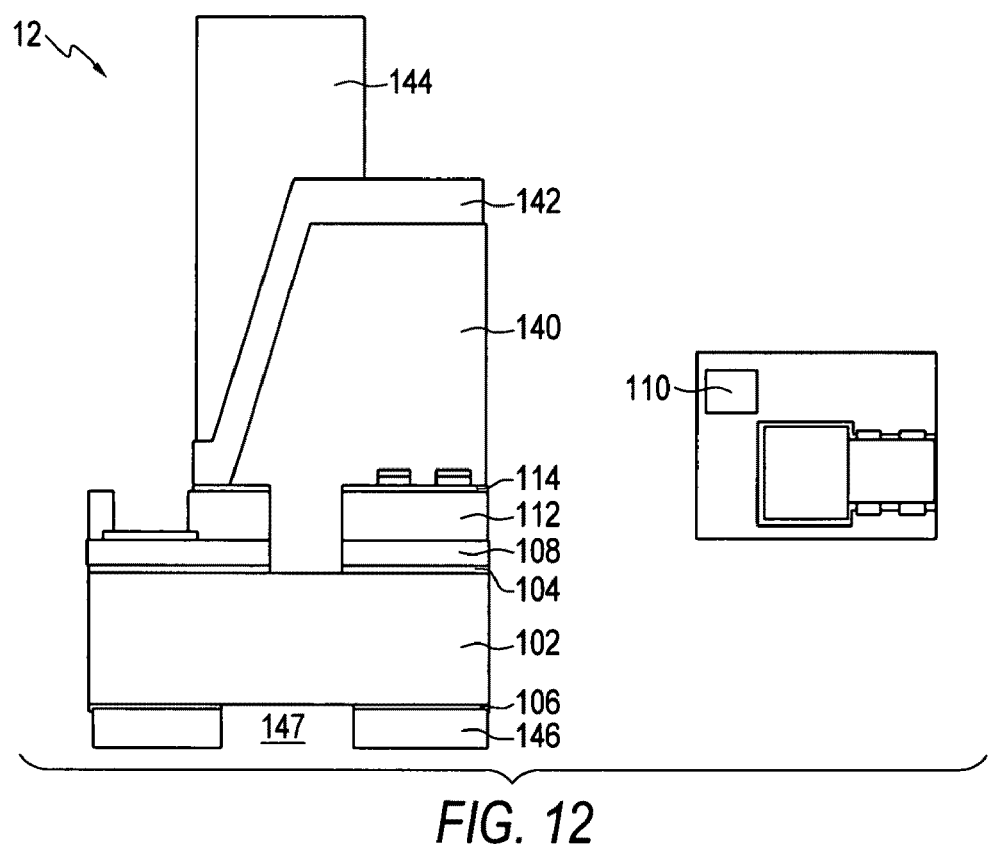
FIG. 12 illustrates the twelfth step of a process for fabricating a shell flow sensor, in accordance with a preferred embodiment.

FIG. 12 illustrates the twelfth step 12 of a process for fabricating a shell flow sensor, in accordance with a preferred embodiment. In the operation depicted in FIG. 12, a photoresist coat can be sprayed onto the back of the wafer substrate 102 and a LAM etch SiO2 operation can be performed for thermal isolation areas and gas inlet/outlet features. Layer 146 constitutes such an SiO2 layer. A gap 147 can form part of a gas inlet/outlet feature.

Figure 13:
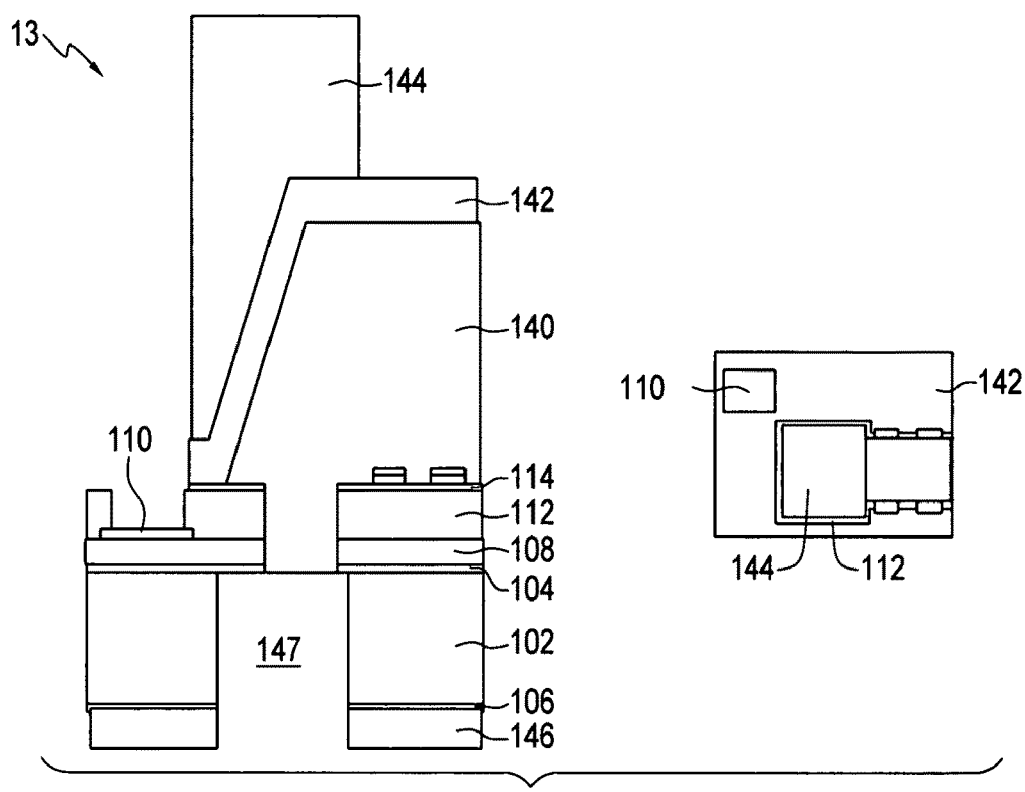
FIG. 13 illustrates the thirteenth step of a process for fabricating a shell flow sensor, in accordance with a preferred embodiment.

FIG. 13 illustrates the thirteenth step 13 of a process for fabricating a shell flow sensor, in accordance with a preferred embodiment. In the operation depicted in FIG. 13, silicon can be DRIE etched to form inlet/outlet holes and thermal isolation features.

Figure 14:
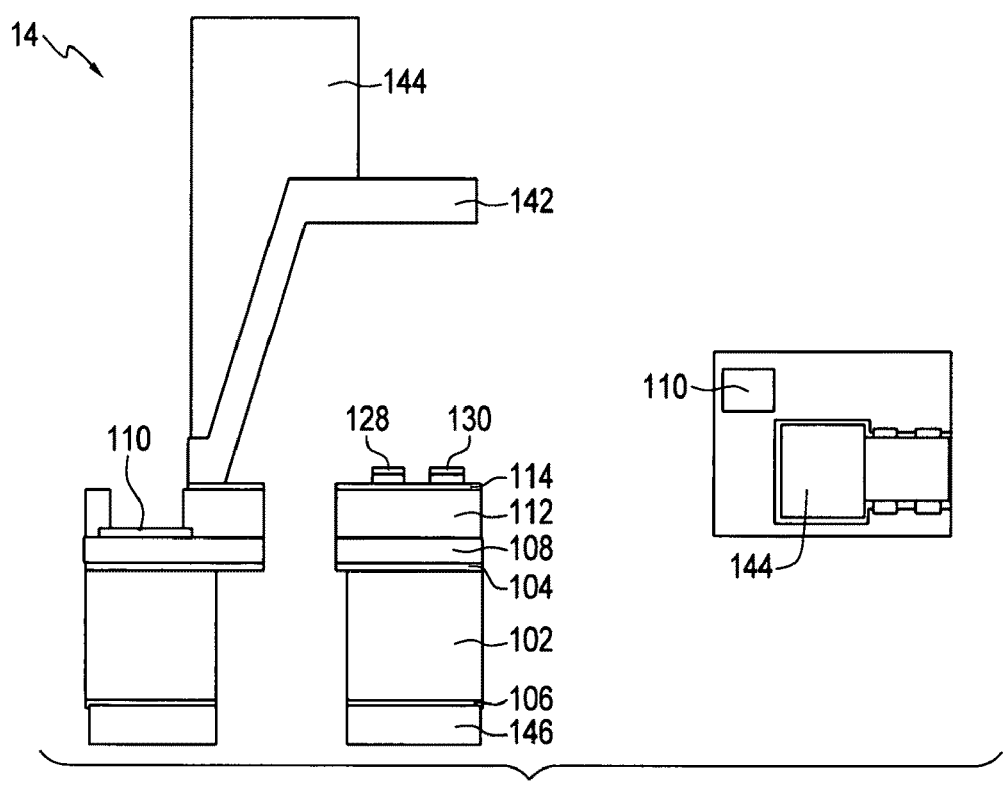
FIG. 14 illustrates the fourteenth step of a process for fabricating a shell flow sensor, in accordance with a preferred embodiment.

FIG. 14 illustrates the fourteenth step 14 of a process for fabricating a shell flow sensor, in accordance with a preferred embodiment. Step 14 depicted in FIG. 14 involves an $O_2$ plasma etch of the polyimide in order to strip the resist 140 back from the wafer/substrate 102. Once the resist 140 is pulled back a gap is located below the layer 142. Layer 144 is maintained above layer 142.

Figure 15:
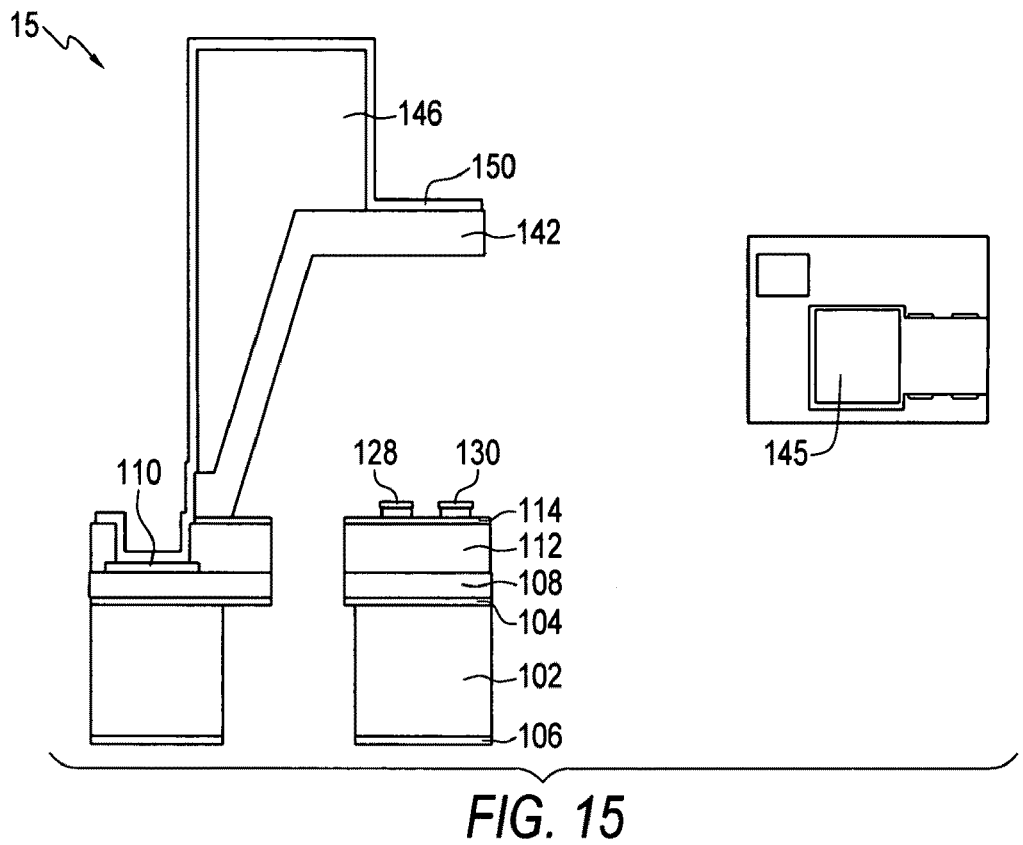
FIG. 15 illustrates the fifteenth step of a process for fabricating a shell flow sensor, in accordance with a preferred embodiment.

FIG. 15 illustrates the fifteenth step 15 of a process for fabricating a shell flow sensor, in accordance with a preferred embodiment. In the operation of step 15, a layer 150 is configured above layer 146 and 142. Layer 150 can constitute a component to seal the resulting shell. Layer 150 may be, for example, a layer of approximately 5000 A TEOS $SiO_2$ (e.g., an approximately 200 C formulation).

Figure 16:
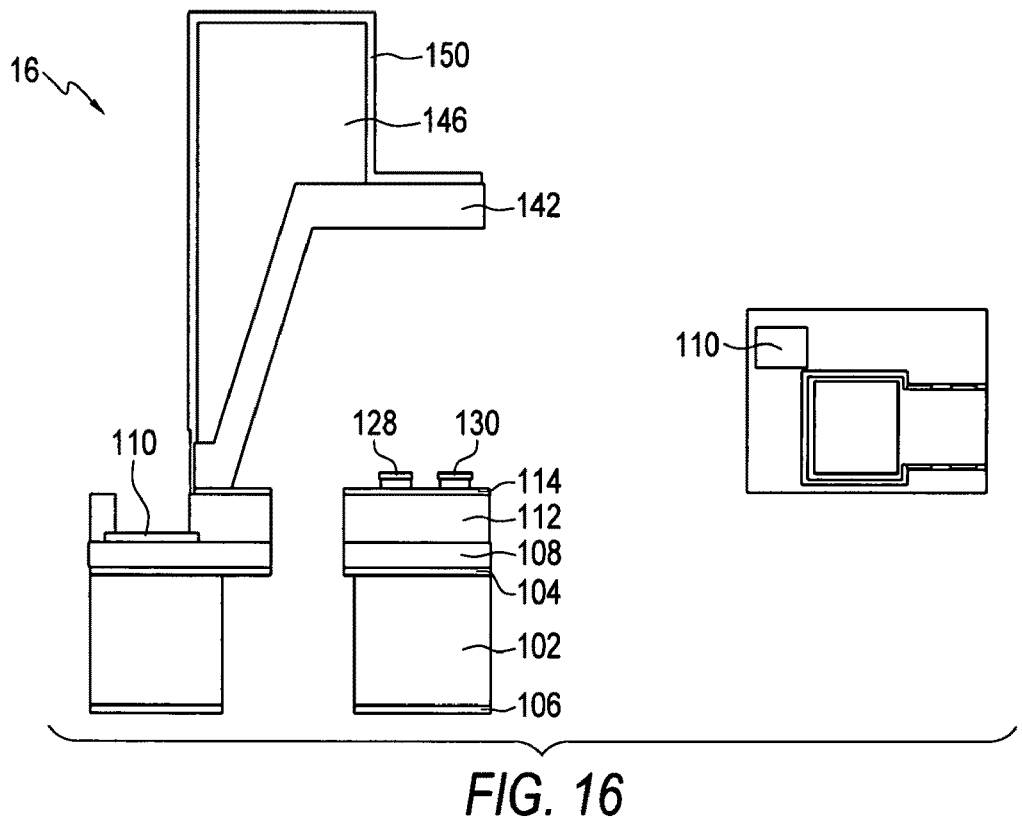
FIG. 16 illustrates the sixteenth step of a process for fabricating a shell flow sensor, in accordance with a preferred embodiment.

FIG. 16 illustrates the sixteenth step 16 of a process for fabricating a shell flow sensor, in accordance with a preferred embodiment. In the operation depicted in FIG. 16, a spray coat and a pattern seal oxide can be provide to expose the bond pads 128, 130. An oxygen plasma etch can also be provide to remove any resist. FIGS. 1-16 thus generally illustrate one possible shell fabrication process for configuring and providing a shell flow sensor. It is possible, for example, to implement such a process without the use of bottom dielectrics and with DRIE etched access holes.

Figure 17:
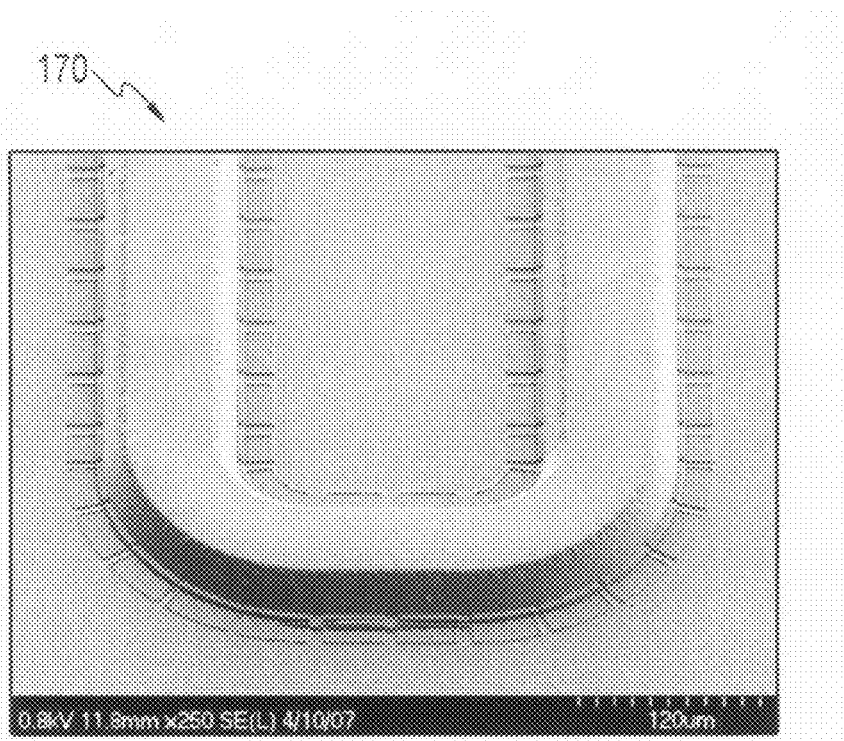
FIG. 17 illustrates a close-up photographic view of a released and sealed $SiO_2$ shell, which can be implemented in accordance with a preferred embodiment.
Figure 18:
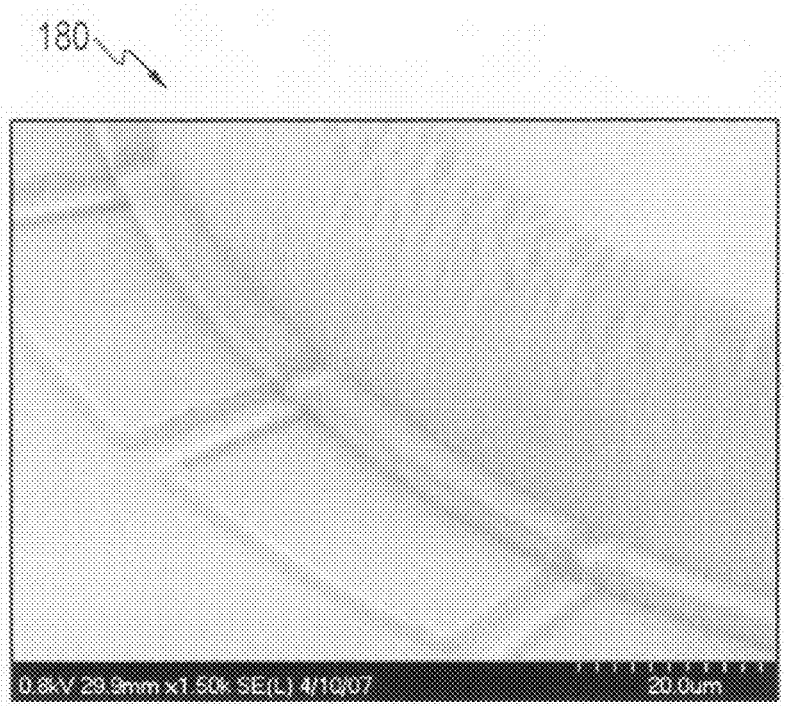
FIG. 18 illustrates a close-up photographic view of a sealed etch vent port, which can be implemented in accordance with a preferred embodiment.

FIG. 17 illustrates a close-up photographic view of a released and sealed $SiO_2$ shell 170, which can be implemented in accordance with a preferred embodiment. FIG. 18 illustrates a close-up photographic view of a sealed etch vent port 180, which can be implemented in accordance with a preferred embodiment. Such shells can be utilized to create enclosed flow channels of the order of 25 μm high by 100-200 μm wide. The SEM's can be of channels 25 μm high by 110 μm wide. Higher flow channels for lower pressure drop can also be implemented in accordance with the embodiments described herein. Possible applications of the on chip fluidic channels are PHASED pre-concentration and separation devices, minimal volume thermal flow sensor for liquids or gases, optical analysis of liquid or gas stream (e.g., channels are transparent and DRIE etch could provide fiber alignment to channel).

Providing well controlled flow conditions for a microbridge flow sensor is a challenging issue. In particular, attempting to use the sensor for liquid flow sensing can be challenging. The disclosed concept results in the construction of not only a flow sensor but walls defining the flow profile on one chip. The use of "shell" processing concepts can permit construction of a glass shell flow containment above a microbridge like device (e.g., diaphragm version) to maximally couple the fluidic heat transfer between the fluid flow defined by the shell and the heater/sensor configuration built into the bottom diaphragm.

Figure 19:
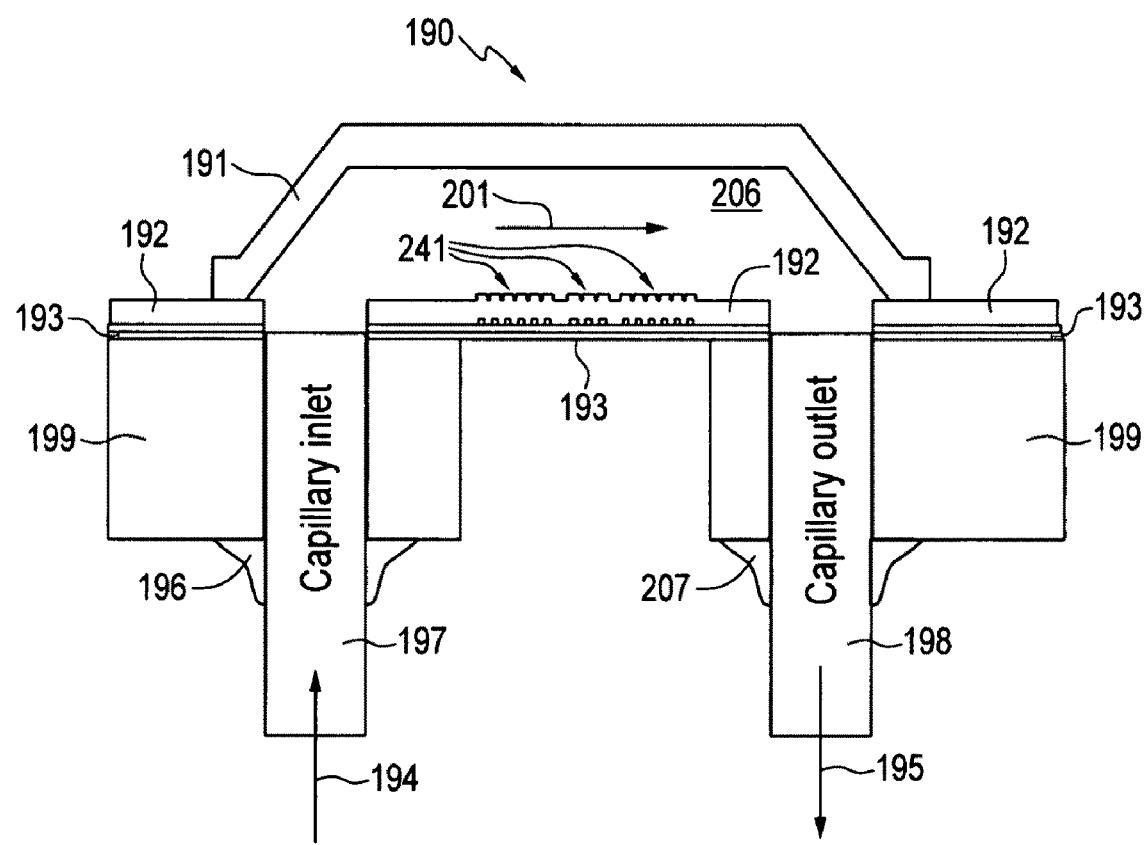
FIG. 19 illustrates a cross-sectional view of a shell flow channel sensing system, which can be implemented in accordance with an alternative embodiment.

FIG. 19 illustrates a cross-sectional view of a shell flow channel sensing system 190, which can be implemented in accordance with such shell processing techniques and in accordance with possible alternative embodiment. System 190 generally includes a layer 191, which can constitute a thick TEOS oxide shell enclosing the flow channel 206 therein. Arrow 201 generally indicates a direction of fluid flow within flow channel 206. A layer 192 is located below the flow channel 206 and can be configured as a thick TEOS base oxide to strengthen the diaphragm A layer 193 is located below layer 192. One or more sensing elements 241 are also illustrated in FIG. 19. Layer 193 generally constitutes a DRIE thermal isolation layer.

Layers 192 and 193 together can constitute a diaphragm thermal isolation for flow sensor elements 241. The substrate 199 is located below the layer 193. A capillary inlet 197, a capillary outlet 198 and a thermal isolation opening can also be formed partially within layer 199. The direction of flow with respect to capillary inlet 197 is indicated by arrow 194. Likewise, the direction of flow with respect to capillary outlet 198 is indicated by arrow 195. Capillary inlet 196 is surrounded partially by an epoxy attachment 196, and capillary outlet 198 is surrounded partially by an epoxy attachment 207. The nature of the sensor is inherently bidirectional and so inlet and outlet aspects can be interchangeable. Note that in some embodiments, if the oxide layers are about 2 microns thick, and the diameter of the shell is 100 microns, then the burst pressure is about 140 PSI (assuming simple pipe model, and SiO2 tensile strength of ~7000 PSI) An SEM of a cleaved shell test structure is shown in the next illustration depicted in FIG. 20.

Figure 20:
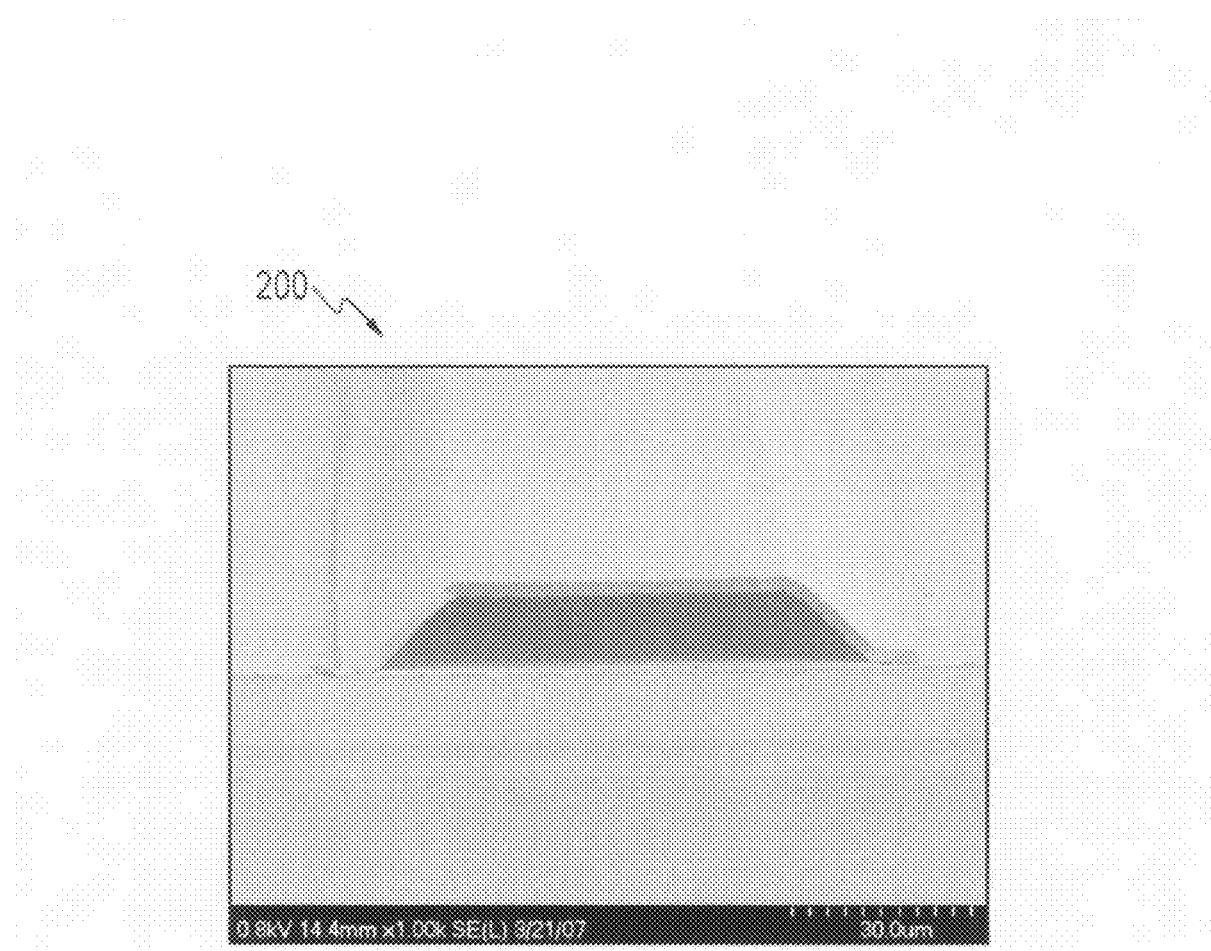
FIG. 20 illustrates a close-up photographic view of a cleaved shell structure, which can be implemented in accordance with an alternative embodiment.

FIG. 20 illustrates a close-up photographic view of a cleaved shell structure 200, which can be implemented in accordance with an alternative embodiment. In generally, the fabrication process described herein can begin with sensors fabricated utilizing a standard microbridge process with the exception of having additional low stress dielectric (e.g., TEOS) to increase the pressure range of the completed device. A thin (~1-2 kA) layer of polyimide capped with $SiO_2$ can be patterned to form what will be slots at the edge of the flow channel 206 illustrated in FIG. 19. Next, a thick layer of polyimide can be deposited and patterned with a slope to form what will be the flow channel 206. A thick layer of $SiO_2$ can be conformably deposited over the polyimide (TEOS) and then patterned to expose the thin polyimide slots at the edge of the flow channel 206. The polyimide is then removed using an oxygen plasma etch, releasing the shells forming the flow channels. The small polyimide slots are then filled in with a final TEOS growth that will seal the flow channels. The oxide is removed from the bond pads.

Three holes can be patterned on the back of each die and DRIE etched through the wafer from the back. Two of the holes will be approximately 380 microns in diameter and be used to attach glass capillaries 197, 198 via respective epoxy attachments 196 207 to couple the fluid flow into and out of the chip (i.e., see arrows 194, 195) and the third hole will remove the silicon from below the flow sensor system 190 providing thermal isolation for the sensor or system 190.

Figure 21:
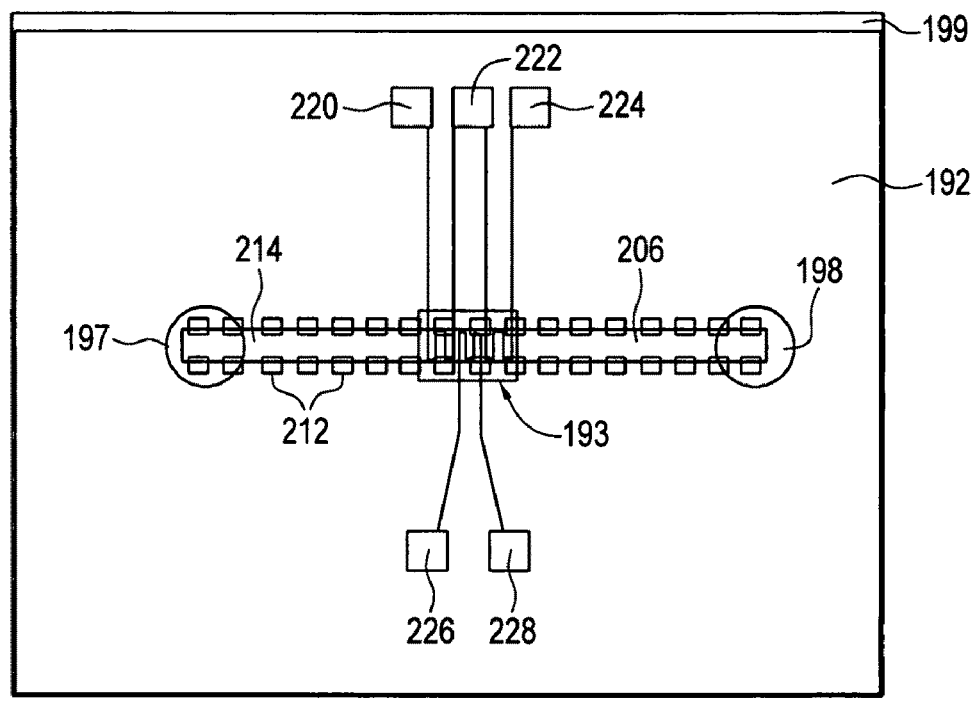
FIGS. 21-22 illustrate alternative top views of the shell flow channel sensing system of FIG. 19, in accordance with an alternative embodiments.
Figure 22:
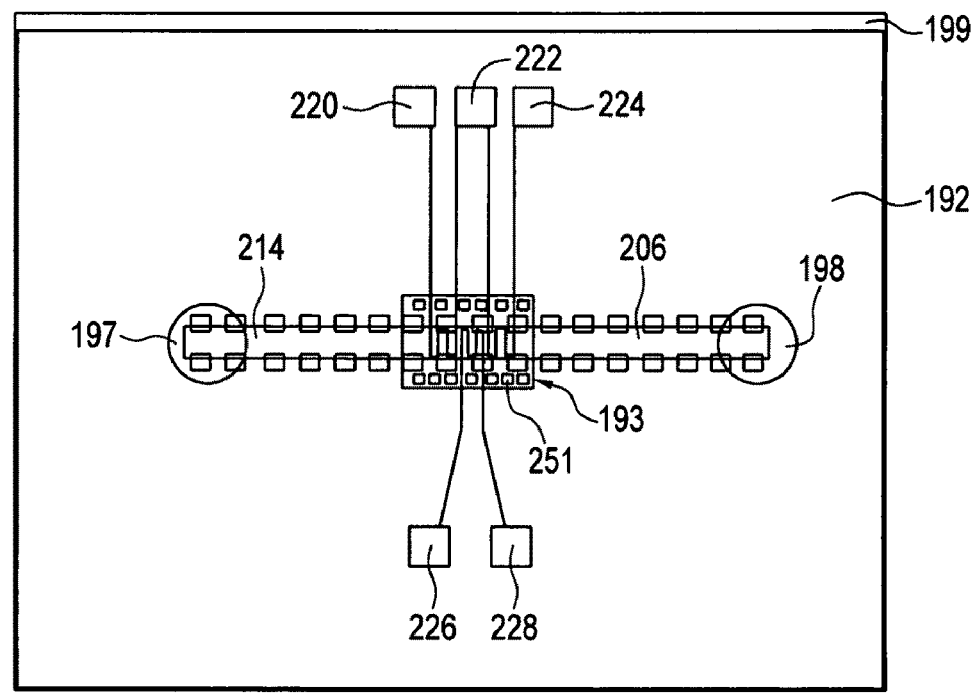

FIGS. 21-22 illustrate alternative top views of the shell flow channel sensing system 190 of FIG. 19, in accordance with an alternative embodiment. Note that in FIGS. 19 and 21-22, identical or similar parts or elements are generally indicated by identical reference numerals. Thus, layer 199 and layer 192 are also shown in FIG. 21-22 with respect to up/down sensor pads 220, 222, 224 and flow channel 206. Additionally, heater pads 226, 228 are shown with respect to the flow channel 206, which is surrounded by a glass shell channel 214. Inlet and outlet channels 197 and 198 are also shown in FIG. 21-22 along with a plurality of thin slots 212 for the removal of polyimide. FIGS. 21-22 represent options available for shell flow sensors (i.e., system 190) including the ability to adjust the thermal conduction of the supports. In applications for gas flow sensing, it is preferred that a minimum thermal conduction be present with respect to the supports for maximum sensitivity. This can be tailored by the size of the opening beneath the diaphragm as illustrated in FIG. 21, or by adding perforations 251 between the shell flow channel 206 and the silicon support.

Note that the thermal isolation can be adjusted by design. In the case of air or other gases, as much thermal isolation as possible is preferred, and can be enhanced by placing cuts through the diaphragm outside of the shell (so it does not leak) to reduce thermal conduction (FIG. 22) or the diaphragm can be made larger (FIG. 21). There are trade-offs in device ruggedness and response time for this performance improvement. In the case of liquids, an enhanced thermal isolation may not be desirable, in which case the diaphragm can be configured smaller, or possibly not etched all the way through the silicon leaving a thin (e.g., ~1-10 um) layer of silicon under the shell.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The embodiments of the invention in which an exclusive property or right is claimed are defined as follows.

Having thus described the invention what is claimed is:

1. A method for fabricating a flow sensor, comprising:
providing a substrate comprising a detector wafer upon which a flow sensor is formed;
configuring upon said substrate, at least one shell whose walls form a flow channel; and
fabricating said flow channel directly upon said substrate in which said flow channel couples heat transfer directly to said flow sensor in order to eliminate a need for two or more different types of sacrificial layers during a fabrication of said flow sensor upon said substrate and in which said at least one shell is coupled with fluidic measurement to provide for said flow sensor.

2. The method of claim 1 further comprising providing in association with said substrate, a low stress dielectric layer in order to increase a pressure range of said flow sensor.

3. The method of claim 1 further comprising providing a thin layer of polyimide capped with $SiO_2$ and patterned with respect to said substrate to form a plurality of slots at an edge of said flow channel.

4. The method of claim 1 further comprising:
depositing with respect to said substrate a thick layer of polyimide; and
patterning a slope thereon to assist in fabricating said flow channel.

5. The method of claim 1 further comprising:
depositing a thick layer of $SiO_2$ over a thick layer of polyimide; and
patterning thick layer of $SiO_2$ to expose a thin layer of polyimide and a plurality of slots at said edge of said flow channel.

6. The method of claim 1 further comprising:
removing polyimide with respect to said substrate using an oxygen plasma etch; and
releasing said at least one shell to form said flow channel; and
thereafter filling a plurality of slots at said edge of said flow channel with a TEOS layer to seal said flow channel.

7. The method of claim 1 further comprising:
patterning a plurality of holes on a backside of said substrate;
thereafter DRIE etching said plurality of holes through said substrate from said backside;
attaching respectively glass capillaries to at least two of said plurality of holes to couple fluid flow into and out of said flow sensor, such that at least one remaining hole among said plurality of holes removes silicon from below said flow sensor, thereby providing thermal isolation for said flow sensor.

8. The method of claim 1 further comprising:
providing in association with said substrate, a low stress dielectric layer in order to increase a pressure range of said flow sensor;
providing a thin layer of polyimide capped with $SiO_2$ and patterned with respect to said substrate to form a plurality of slots at an edge of said flow channel;
depositing with respect to said substrate a thick layer of polyimide;
patterning a slope thereon to assist in fabricating said flow channel;
depositing a thick layer of $SiO_2$ over said thick layer of polyimide; and
patterning thick layer of $SiO_2$ to expose said thin layer of polyimide and a plurality of slots at said edge of said flow channel.

9. The method of claim 8 further comprising:
removing polyimide with respect to said substrate using an oxygen plasma etch; and
releasing said at least one shell to form said flow channel; and
thereafter filling said plurality of slots at said edge of said flow channel with a TEOS layer to seal said flow channel.

10. The method of claim 8 further comprising:
patterning a plurality of holes on a backside of said substrate;
thereafter DRIE etching said plurality of holes through said substrate from said backside;
attaching respectively glass capillaries to at least two of said plurality of holes to couple fluid flow into and out of said flow sensor, such that at least one remaining hole among said plurality of holes removes silicon from below said flow sensor, thereby providing thermal isolation for said flow sensor.

11. A method for fabricating a flow sensor, comprising:

providing a substrate comprising a detector wafer upon which a flow sensor is formed;

configuring upon said substrate, at least one shell whose walls form a flow channel;

fabricating said flow channel directly upon said substrate in which said flow channel couples heat transfer directly to said flow sensor in order to eliminate a need for two or more different types of sacrificial layers during a fabrication of said flow sensor upon said substrate and in which said at least one shell is coupled with fluidic measurement to provide for said flow sensor;

providing in association with said substrate, a low stress dielectric layer in order to increase a pressure range of said flow sensor;

providing a thin layer of polyimide capped with $SiO_2$ and patterned with respect to said substrate to form a plurality of slots at an edge of said flow channel;

depositing with respect to said substrate a thick layer of polyimide;

patterning a slope thereon to assist in fabricating said flow channel;

depositing a thick layer of $SiO_2$ over said thick layer of polyimide; and patterning thick layer of $SiO_2$ to expose said thin layer of polyimide and a plurality of slots at said edge of said flow channel.

12. The method of claim 11 further comprising:

removing polyimide with respect to said substrate using an oxygen plasma etch; and releasing said at least one shell to form said flow channel; and thereafter filling said plurality of slots at said edge of said flow channel with a TEOS layer to seal said flow channel.

13. The method of claim 11 further comprising:

patterning a plurality of holes on a backside of said substrate;

thereafter DRIE etching said plurality of holes through said substrate from said backside;

attaching respectively glass capillaries to at least two of said plurality of holes to couple fluid flow into and out of said flow sensor, such that at least one remaining hole among said plurality of holes removes silicon from below said flow sensor, thereby providing thermal isolation for said flow sensor.

* * * * *